(12) United States Patent
Shiung et al.

(10) Patent No.: US 7,269,233 B2
(45) Date of Patent: Sep. 11, 2007

(54) ALGORITHM OF BIT SYNCHRONIZATION FOR A DIGITAL FSK CORRELATION RECEIVER

(75) Inventors: David Shiung, Tainan (TW); Yung-Lung Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 906 days.

(21) Appl. No.: 10/248,519

(22) Filed: Jan. 27, 2003

(65) Prior Publication Data

US 2004/0146125 A1 Jul. 29, 2004

(51) Int. Cl.
*H03D 1/00* (2006.01)
*H04L 26/06* (2006.01)

(52) U.S. Cl. .................. 375/334; 375/269; 375/272

(58) Field of Classification Search ................ 375/305, 375/334, 279, 272, 274, 277, 278, 308, 329, 375/331; 370/503, 386
See application file for complete search history.

(56) References Cited

U.S. PATENT DOCUMENTS

| | | | | |
|---|---|---|---|---|
| 4,894,847 A | * | 1/1990 | Tjahjadi et al. | 375/377 |
| 4,914,699 A | * | 4/1990 | Dunn et al. | 380/34 |
| 6,438,173 B1 | * | 8/2002 | Stantchev | 375/260 |
| 6,665,308 B1 | * | 12/2003 | Rakib et al. | 370/441 |
| 7,035,352 B1 | * | 4/2006 | Malone et al. | 375/334 |
| 7,039,132 B1 | * | 5/2006 | Chen et al. | 375/334 |

* cited by examiner

*Primary Examiner*—Mohammed Ghayour
*Assistant Examiner*—Qutub Ghulamali
(74) *Attorney, Agent, or Firm*—Jianq Chyun IP Office

(57) ABSTRACT

An algorithm for bit synchronization in a frequency shift keying (FSK) receiver. In the algorithm, a training sequence is received from a transmitter. The training sequence has a plurality of bits. A starting point of a next bit received by the FSK receiver after the training sequence is determined according to peak values of the bits of the training sequence.

13 Claims, 2 Drawing Sheets

ALGORITHM OF BIT SYNCHRONIZATION FOR A DIGITAL FSK CORRELATION RECEIVER

BACKGROUND OF INVENTION

1. Field of Invention

The present invention relates to an algorithm of bit synchronization for a digital frequency shift keying (FSK) correlation receiver. More particularly, the present invention relates to an algorithm of bit synchronization for a digital FSK correlation receiver, in which a training sequence with a bit pattern is used for bit synchronization.

2. Description of Related Art

As wireless technology revolutionizes the world, different products covering a wide-range cost are developed to satisfy consumers" need. FSK is frequently used in wireless systems for its performance and well-known technology. In any conventional FSK correlation receiver, there must be an external synchronization circuit for bit synchronization. The external synchronization is complicated involving multiple logical, judging, and sampling circuits which are high in cost to manufacture. Prior art uses various well-known synchronization methods such as Early-Late Gate tracking loop or Mueller and Muller synchronizer, et al. However all the above-mentioned circuits are complicated which increase overall die size and cost and therefore not suitable for application in low-cost wireless devices which requires acceptable performance at a fraction of the cost.

SUMMARY OF INVENTION

Accordingly, one object of the present invention is to provide an algorithm for a FSK correlation receiver, capable of bit synchronization, clock recovery and timing recovery without an additional complex synchronization and a timing recovery circuit, instead, just with a simple circuit required. The cost and overall die size for such bit synchronization, clock recovery and timing recovery functions in the FSK correlation receiver are significantly reduced.

To achieve these and other advantages and in accordance with the purpose of the invention, as embodied and broadly described herein, the invention provides an algorithm for bit synchronization in a frequency shift keying (FSK) receiver. The algorithm is described as followed. A training sequence is received from a transmitter. The training sequence has a plurality of bits. A starting point of a next bit received by the FSK receiver after the training sequence is determined according to peak values of the bits of the training sequence.

Each of the bits is divided into a plurality of points. The peak value is determined according to the points of the bit in a corresponding test range. In an alternative embodiment, the peak value is a maxima value in the in the corresponding test range if the bit is "1" and the peak value is a minima value in the corresponding test range if the bit being "0".

The start point of the next bit received by the FSK receiver is determined by summing the peak values, dividing the summation by the number of the bits, and then adding a bias value. The bias value is predetermined and set according to the length of the training sequence. In an alternative embodiment, the bias value is determined and set by summing the number of points of all of the bits in the training sequence, and dividing the summation by the number of the bits.

To achieve these and other advantages and in accordance with the purpose of the invention, as embodied and broadly described herein, the invention provides an algorithm for bit synchronization in a frequency shift keying (FSK) receiver. The algorithm is described as followed. A training sequence having a plurality of bits is received from a transmitter. Peak values are determined corresponding to each of the received bits in a corresponding test range of each of the received bits. A starting point of a next bit received by the FSK receiver after the training sequence is determined in according to the peak values.

Each of the bits is divided into a plurality of points, and then the peak value is determined according to the points of the bit in the corresponding test range. In an alternative embodiment, the peak value is a maxima value in the in the corresponding test range if the bit is "1". The peak value is a minima value in the corresponding test range if the bit being "0".

The start point of the next bit received by the FSK receiver is determined by summing the peak values, dividing the summation by the number of the bits, and then adding a bias value.

The bias value is predetermined and set according to the length of the training sequence. In an alternative embodiment, the bias value is determined and set by summing the number of points of all of the bits in the training sequence, and dividing the summation by the number of the bits.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
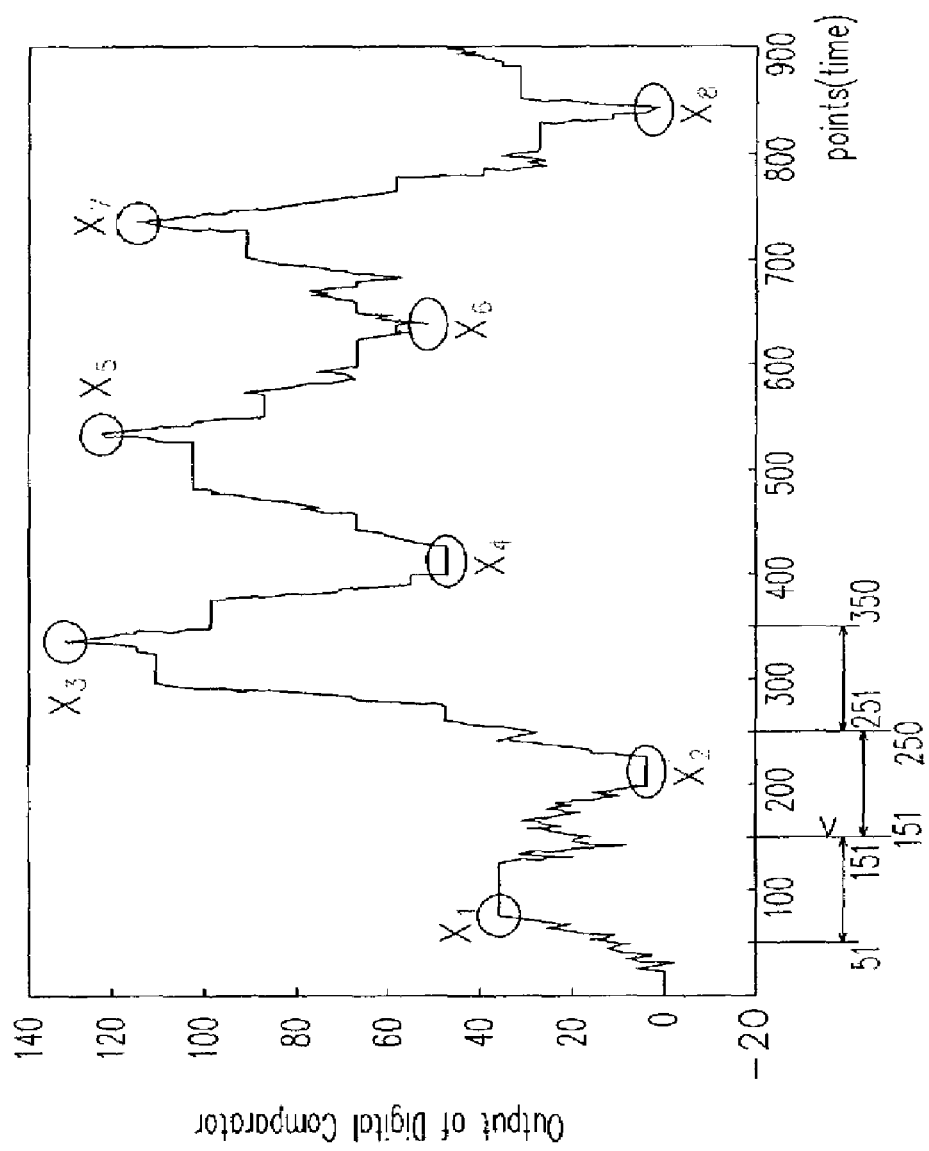
FIG. 1 is a graph showing output of a digital comparator of a FSK correlation receiver of a preferred embodiment of the invention for the predetermined training sequence "101010101" used in the embodiment.

Reference will now be made in detail to the present preferred embodiments of the invention, examples of which are illustrated in the accompanying drawings. Wherever possible, the same reference numbers are used in the drawings and the description to refer to the same or like parts.

The present invention provides an algorithm for a FSK correlation receiver, capable of bit synchronization, clock recovery and timing recovery, which uses a predetermined training sequence. The baseband demodulator with the algorithm of the present invention can be applied in any wireless system such as RF or broadband. The demodulator includes only a simple circuitry such as several registers and simple processing circuitry for achieving decent bit synchronization at a very low cost.

The FSK wireless system has a transmitter and a receiver. The transmitter sends out a predetermined training sequence which can be any number of bits the user sets. The digital FSK receiver receives the transmitted training sequence and then determines the shifting by comparing the theoretical value and the actual value. In a preferred experimental embodiment, an 8-bit-length training sequence is used "101010101" and each bit is further divided into 100 points. As a result, the points are used to represent time in an accurate manner. 8-bit-length training sequence is a preferable choice for a balance in performance and cost. In an alternative embodiment, larger bit length can be employed for more precision; however, cost is more than the former.

In the embodiment of the present invention, a starting point of the next bit can be determined after determining the shifting from the previous bits. Since a training sequence of 8 bits is used, the first 8 bits of received data are used for bit synchronization. This training sequence accurately determines the starting point of the ninth peak for synchronization purposes. A digital comparator of the demodulator of the digital FSK receiver sends out eight peak values such as minima and maxima values because there is a peak for every bit. In the training sequence, "1" represents a local maximum and "0" represents a local minimum. Referring to FIG. 1, which is a graph showing output of the digital comparator for the predetermined training sequence "101010101" used in the embodiment. There are a local maximum or local minimum for every bit within a corresponding test range. A first peak is X1 because it corresponds to the first bit "1" of the training sequence. Every a local maximum or local minimum should lie within the given range from 51 to 150 for increments of 100 for each bit. Following seven peaks X2, X3, X4, X5, X6, X7 and X8 of FIG. 2 respectively represents the other seven bits "101010101" after the first bit "1".

However because of additive white Gaussian noise (AWGN) or other noises which exist in all wireless devices, the local maximum and local minimum of the corresponding peaks will be shifted by a few points from their nominal value. Therefore it is important to determine the amount of shifting occurring in the system for bit synchronization. The calculation of the amount of shifting corresponding to each bit of the training sequence is used for the algorithm of bit synchronization in the FSK correlation receiver of the invention.

The noise such as AWGN that affects every bit can be different but the overall effect can be averaged so that bit synchronization can be achieved. Depending on the configuration of the training sequence, a local maximum or local minimum is tested for within a given test range of that particular bit. For example, for the training sequence "101010101", a first test for "1" is a local maximum test in the test range is from 51 to 1 50 covering the first bit at the nominal value of 100 with a test range of 100 points. A second test for "0" is a local minimum test at the nominal value of 200 in the test range from 151 to 250. Since the test for either local maximum and minimum is known from the training sequence in any given test range, errors in calculating the true local maximum and minimum is eliminated. It is to be noted that in order to calculate the exact local minimum and maximum, every single point is processed to compare and determine the local maximum and minimum for the given range. Furthermore, obtained values of the local maximum and minimum are rounded off to the appropriate point.

Figure 2:
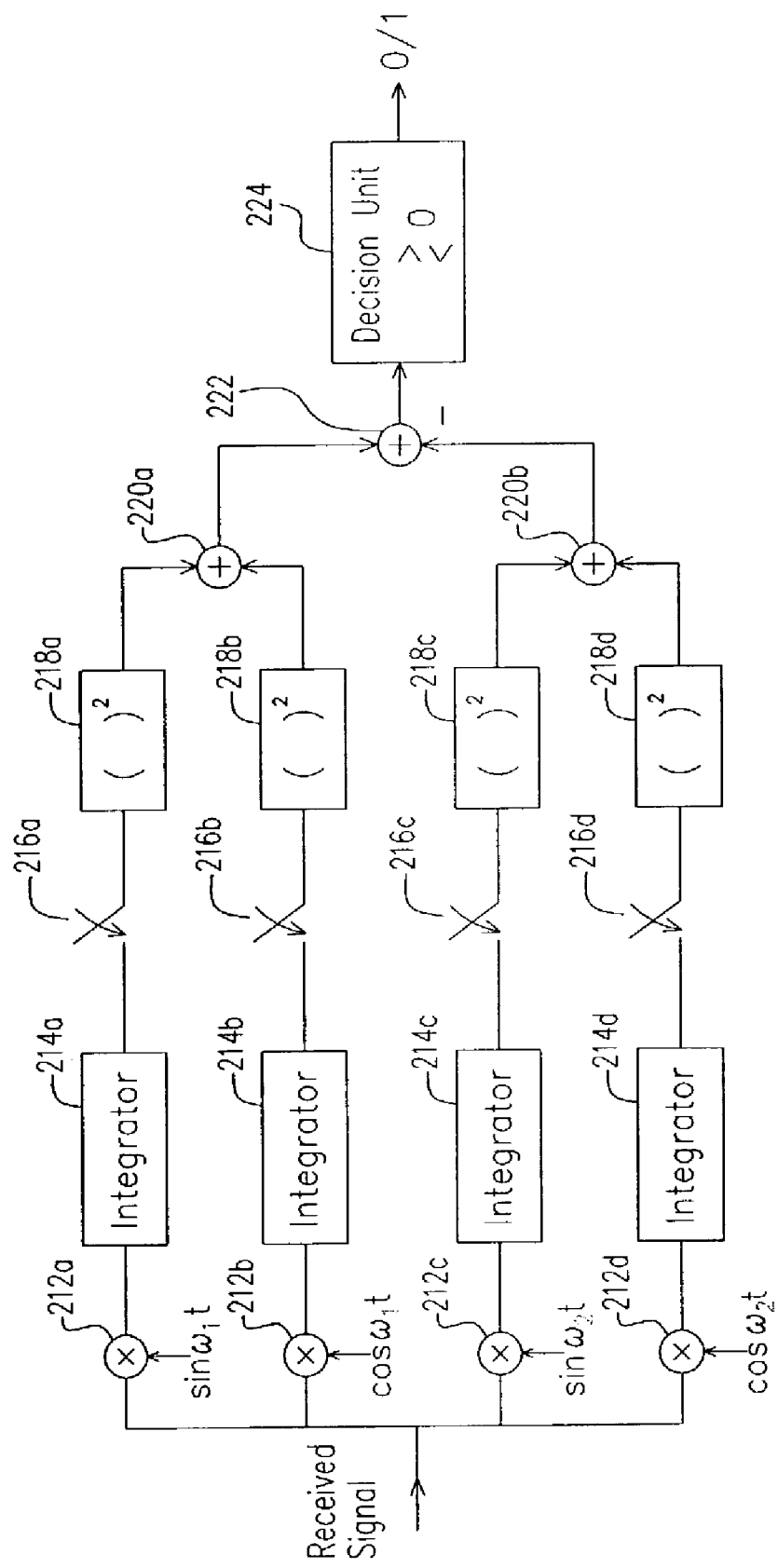
FIG. 2 is a schematic diagram of a digital FSK correlation receiver of a preferred embodiment of the invention.

The exact starting point a certain bit, for example, the ninth bit, is determined by summing the previous obtained values and dividing the summation by the number of values used. For example, in the embodiment as shown in FIG. 2, X1=98, X2=202, X3=297, X4=404, X5=500, X6=610, X7=703 and X8=802. The summation of these peaks corresponding to the bits of the training sequence is 98+202+ 297+404+500+610+703+802. After dividing the summation by the number of values used, in the example, the summation is divided with 8. Then, a bias value is added to the result, in our case (98+202+297+404+500+610+703+802)/ 8+450=902. If the answer is not an integer, then it needs to be rounded off to the closest integer according to common rounding off methods. The value of the bias is calculated by summing the nominal values of the bits without noise and dividing the summation by the number of bits used in the training sequence. Therefore the value of the bias is predetermined and set according to the length of the training sequence. In this embodiment, (100+200+300+400+500+ 600+700+800)/8=450. Therefore, by using the method of the embodiment, the exact starting point of the next bit is exactly calculated. The equation of the method can be shown as (X1+X2, . . . , Xn)/n+bias, n representing the number of bits and the bias is predetermined and set according to the length of the training sequence.

If we want to improve the accuracy of the bit synchronization, the training sequence can be extended to a longer training sequence with more bits. The timing of the local maximum and minimum can be more accurately calculated because there are more points within two bits. However if we increase the bit length of the training sequence, the processing ability needs to be corresponding increased. This will in fact increase cost. If the training is infinitely long, therefore we can hypothetically take the average of all the points and with by adding an appropriate bias, we can get the prefect bit synchronization. This can be proven by the Weak Law of Large Number, which is described as followed.

Let X1, X2, . . . , Xn be independent and identical distributed random variables with mean $\mu$ and variance $\sigma^2$. Then for any $\delta > 0$, we have $$\lim_{n \to \infty} Pr\left(\left|\frac{1}{n}\sum_{i=1}^{n} X_i - \mu\right| \geq \delta\right) = 0$$

if n is large enough, bit boundary can be determined exactly.

Alternatively, the accuracy of this algorithm can be increased by increasing the over-sampling rate, that is the division of bit into points. In this embodiment, one bit is divided into 100 points but the bit can be divided into more points which are infinitely minuscule parts for improved accuracy. It is to be noted that the increase in bit length of training sequence is a much more effective method to increase accuracy. However increasing the sampling rate does not necessarily increase the cost because it can be adjusted by a PLL.

FIG. 2 is a schematic diagram of a digital FSK correlation receiver of a preferred embodiment of the invention. The receiver includes demodulators 212a, 212b, 212c and 212d; integrators 214a, 214b, 214c and 214d; switches 216a, 216b, 216c and 216d; sampling devices 218a, 218b, 218c and 218d; adders 220a and 220b; a digital comparator 222; and a decision unit 224. The predetermined training sequence is sent to with the data from the transmitter. The FSK correlation receiver receives the signal and multiple the signal with 4 different frequencies which shifts the phase of the signals, for example, the received signal is multiplied with sin $\omega_1$t and cos $\omega_1$t by the demodulators 212a and 212b, the received signal multiplied with sin $\omega_2$t and cos $\omega_2$t by the demodulators 212c and 212d. The signals are then respectively sent to corresponding integrators, for example, 214a, 214b, 214c and 214d for converting into a digital signal. The 4 signals are simultaneously sampled at every single point by the sampling devices 218a, 218b, 218c and 218d and the result is sent to the adders 220a and 220b and then to the digital comparator 222. The comparator 222 compares the inputs and output a final value in the form of 0 or 1 through decision unit 224. The result of the digital comparator 222 is the indication of whether the particularly tested point is indeed a maximum or minimum. The actual implementation of the FSK correlation receiver can be done in an analog system.

An experiment is simulation is performed using this method of the preferred embodiment of the present invention and the result shows an average error of 12.2. In contrast, the error using conventional limiter detected with Received Signal Strength Index (RSSI) and Power Detector (PD) is 22.5 which is significantly higher than the result of the present invention. The following are some experimental results of the simulation: 906, 885, 922, 894, 868, 907, 883, 885, 905, 899, 887, 892, 889, 910, 899.

The FSK correlation receiver with the algorithm of the preferred embodiment of the invention is capable of bit synchronization by a simple circuitry using a predetermined training sequence for achieving decent bit synchronization at a very low cost. The FSK correlation receiver has bit synchronization function without an additional complex synchronization and a timing recovery circuit, instead, just with a simple circuit required. The cost and overall die size for such bit synchronization functions in the FSK correlation receiver are significantly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method for bit synchronization in a frequency shift keying (FSK) receiver, the method comprising steps of:
   receiving a training sequence from a transmitter, wherein the training sequence having a plurality of bits;
   determining peak values corresponding to each of the received plurality of bits of the training sequence in a corresponding test range of each of the received plurality of bits; and
   determining a starting point of a next bit received by the FSK receiver after the training sequence according to the peak values;
   wherein, the starting point of the next bit received by the FSK receiver is determined by summing the peak values, dividing the summation by a number of the received plurality of bits of the training sequence, and then adding a bias value.

2. The method of claim 1, the each of the received bits being divided into a plurality of points, the peak value being determined according to the points of the bit in the corresponding test range.

3. The method of claim 2, wherein the peak value is a maxima value in the corresponding test range if the bit is "1".

4. The method of claim 2, wherein the peak value is a minima value in the corresponding test range if the bit being "0".

5. The method of claim 1, wherein the bias value is predetermined and set according to a length of the training sequence.

6. The method of claim 1, wherein the bias value is determined and set by summing the number of points of all of the bits in the training sequence, and dividing the summation by the number of the bits.

7. A frequency shift keying (FSK) receiver using the method for bit synchronization as claimed in claim 1.

8. An method for bit synchronization in a frequency shift keying (FSK) receiver, the method comprising steps of:
   receiving a training sequence from a transmitter, wherein the training sequence having a plurality of bits; and
   determining a starting point of a next bit received by the FSK receiver after the training sequence according to peak values of the bits of the training sequence, wherein the starting point of the next bit received by the FSK receiver is determined by summing the peak values, dividing the summation by a number of the received plurality of bits of the training sequence, and then adding a bias value.

9. The method of claim 8, the each of the bits being divided into a plurality of paints, the peak value being determined according to the plurality of points of the bit in a corresponding test range.

10. The method of claim 9, wherein the peak value is a maxima value in the in the corresponding test range if the bit is "1" and the peak value is a minima value in the corresponding test range if the bit being "0".

11. The method of claim 8, wherein the bias value is predetermined and set according to a length of the training sequence.

12. The method of claim 8, wherein the bias value is determined and set by summing the number of points of all of the bits in the training sequence, and dividing the summation by the number of the bits.

13. A frequency shift keying (FSK) receiver using the method for bit synchronization as claimed in claim 8.

* * * * *